(12) United States Patent
De Garavilla

(10) Patent No.: US 8,044,136 B2
(45) Date of Patent: Oct. 25, 2011

(54) GOLF BALLS WITH CORES OR INTERMEDIATE LAYERS PREPARED FROM HIGHLY-NEUTRALIZED ETHYLENE COPOLYMERS AND ORGANIC ACIDS

(75) Inventor: James R. De Garavilla, Silsbee, TX (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 462 days.

(21) Appl. No.: 12/261,331

(22) Filed: Oct. 30, 2008

(65) Prior Publication Data

US 2009/0118040 A1    May 7, 2009

Related U.S. Application Data

(60) Provisional application No. 61/001,454, filed on Nov. 1, 2007.

(51) Int. Cl.
*A63B 37/04* (2006.01)
*C08L 33/02* (2006.01)

(52) U.S. Cl. ........ 524/556; 473/374; 473/376; 473/377; 521/149; 524/400

(58) Field of Classification Search ........................ None
See application file for complete search history.

(56) References Cited

U.S. PATENT DOCUMENTS

| | | | | |
|---|---|---|---|---|
| 6,100,321 | A * | 8/2000 | Chen | 524/400 |
| 6,653,382 | B1 * | 11/2003 | Statz et al. | 524/400 |
| 6,777,472 | B1 * | 8/2004 | Statz et al. | 524/322 |
| 6,815,480 | B2 * | 11/2004 | Statz et al. | 524/322 |
| 6,953,820 | B2 * | 10/2005 | Statz et al. | 524/322 |
| 7,375,151 | B2 * | 5/2008 | Statz et al. | 524/322 |
| 2001/0019971 | A1 * | 9/2001 | Hayashi et al. | 473/371 |
| 2002/0013421 | A1 * | 1/2002 | Takesue et al. | 525/418 |
| 2003/0050373 | A1 * | 3/2003 | Chen | 524/322 |
| 2003/0114565 | A1 * | 6/2003 | Chen et al. | 524/322 |
| 2006/0189413 | A1 * | 8/2006 | Boehm et al. | 473/371 |
| 2007/0173348 | A1 * | 7/2007 | Rajagopalan et al. | 473/351 |

FOREIGN PATENT DOCUMENTS

WO    WO 2009/059117 A2 *    5/2009

OTHER PUBLICATIONS

U.S. Appl. No. 09/422,142, "Highly-Resilient Thermoplastic Elastomer Compositions," Statz et al., Oct. 21, 1999, abandoned.*
U.S. Appl. No. 12/471,925, "Golf Balls with Cores or Intermediate Layers Prepared from Highly-Neutralized Ethylene Terpolymers and Organic Acids," Garavilla, May 26, 2009.*
International Search Report and Written Opinion mailed Jul. 24, 2009 for PCT international application No. PCT/US2008/081969.*

* cited by examiner

*Primary Examiner* — Robert Sellers
(74) *Attorney, Agent, or Firm* — Richard J. Brown

(57) ABSTRACT

Disclosed are golf balls comprising cores or intermediate layers prepared from thermoplastic compositions having coefficients of restitution equal to or greater than 0.83 and PGA compressions greater than 100. Also disclosed is a composition comprising or prepared from (a) at least one aliphatic, mono-functional organic acid having from 16 to 20 carbon atoms, wherein the organic acid is unsaturated and linear; (b) an ethylene acid copolymer consisting essentially of copolymerized comonomers of ethylene and from 18 to 24 weight % of copolymerized comonomers of at least one $C_3$ to $C_8$ $\alpha,\beta$ ethylenically unsaturated carboxylic acid, based on the total weight of the ethylene acid copolymer, having a melt index from about 200 to about 600 g/10 minutes; wherein the combined acid moieties of (a) and (b) are nominally neutralized to a level from about 120% to about 200%; and optionally (c) filler.

22 Claims, No Drawings

GOLF BALLS WITH CORES OR INTERMEDIATE LAYERS PREPARED FROM HIGHLY-NEUTRALIZED ETHYLENE COPOLYMERS AND ORGANIC ACIDS

CROSS-REFERENCE TO RELATED APPLICATION

The present application claims priority to U.S. Provisional Appln. No. 61/001,454, filed on Nov. 1, 2007, which is incorporated herein by reference in its entirety.

BACKGROUND OF THE INVENTION

1. Field of the Invention

The invention relates to golf balls with cores or intermediate layers prepared from melt-processible thermoplastic compositions comprising organic acids or salts of organic acids and neutralized copolymers of ethylene and $C_3$ to $C_8$ $\alpha,\beta$ ethylenically unsaturated carboxylic acids.

2. Description of Related Art

Several patents and publications are cited in this description in order to more fully describe the state of the art to which this invention pertains. The entire disclosure of each of these patents and publications is incorporated by reference herein.

Premium golf balls include wound balls, two-piece balls and multilayered balls. Wound balls may have a spherical molded center, elastomeric thread-like material wound around the center, and either a thermoplastic or thermoset cover. Two-piece balls have a spherical molded core covered with a thin layer of thermoplastic or thermoset material. Multilayered balls have a spherical molded core, a cover, and one or more intermediate layers between the core and the cover.

Centers for wound balls and cores for two-piece and multilayer balls have been made using a thermoset rubber such as polybutadiene rubber. With thermoset rubber, complex multi-step processes are needed to make cores and centers. These processes result in scrap that is difficult to recycle. Attempts to solve these difficulties by substituting a thermoplastic for the thermoset rubber have had limited success.

Thermoplastic ionomers of copolymers of alpha olefins, particularly ethylene, and $C_{3-8}$ $\alpha,\beta$ ethylenically unsaturated carboxylic acids have found utility in golf ball components such as covers, and other applications. U.S. Pat. No. 3,264,272 teaches methods for making such ionomers. The acid copolymers on which the ionomers are based may be prepared as described in U.S. Pat. No. 4,351,931.

Some ionomer compositions, and golf ball covers comprising these compositions, are described in U.S. Pat. Nos. 5,688,869; 6,150,470; 6,277,921; 6,433,094; 6,451,923; 6,573,335 and 6,800,695. The ionomer compositions comprise metal cation neutralized high acid ionomer resins comprising copolymers of greater than 16% by weight of an alpha,beta-unsaturated carboxylic acid and the balance an alpha-olefin, of which about 10 to about 90% of the acid groups of the copolymer are neutralized with metal cations.

Ionomers have also been modified with fatty acids. For example, U.S. Pat. No. 6,777,472 describes a thermoplastic composition that is melt-processible consisting essentially of (a) from 20 to 45 weight % aliphatic, mono-functional organic acid(s) having fewer than 36 carbon atoms or salt(s) thereof; and (b) ethylene, $C_3$ to $C_8$ alpha,beta ethylenically unsaturated carboxylic acid copolymer(s) or melt-processible ionomer(s) thereof, wherein greater than 90% of all the acid of (a) and (b) is neutralized by concurrently or subsequently adding to the melt blend of (a) and (b) an amount of a cation source necessary to obtain greater than 90% neutralization.

Modified ionomers have been used as golf ball components. U.S. Pat. No. 6,565,456 describes multilayer golf balls comprising a solid core, a surrounding layer, an intermediate layer and a cover, wherein at least one of the surrounding layer, the intermediate layer or the cover is formed of a heated mixture comprising (a) an olefin-carboxylic acid-optional carboxylate random copolymer and/or (d) a metal ion-neutralized olefin-carboxylic acid-optional carboxylate random copolymer; (b) a fatty acid or derivative; and (c) a neutralizing basic inorganic metal compound.

It is desirable to provide a high performance material to be used in the cores, centers or intermediate layers of golf balls.

SUMMARY OF THE INVENTION

Provided herein is a golf ball comprising a core and a cover and optionally at least one intermediate layer positioned between the core and the cover, wherein the core or an intermediate layer when present comprises or is prepared from a thermoplastic composition, wherein the thermoplastic composition when formed into a sphere of 1.50 to 1.68 inches in diameter has a coefficient of restitution ("COR") equal to or greater than 0.860 or 0.870, if the thermoplastic composition is unfilled, and greater than 0.830 or 0.845 or 0.850, if the thermoplastic composition further comprises a filler. The coefficient of restitution is measured by firing the sphere at an initial velocity of 125 feet/second against a steel plate positioned 3 feet from the point where initial velocity is determined and dividing the velocity of rebound from the plate by the initial velocity. The thermoplastic composition also has a PGA compression greater than 100.

Further provided are golf balls wherein the thermoplastic composition is as described below.

In addition, the thermoplastic composition may comprise or prepared from:

(a) at least one aliphatic, monofunctional organic acid having 4 to 36 carbon atoms, wherein the longest carbon chain of the acid is optionally substituted with from one to three substituents independently selected from $C_1$ to $C_8$ alkyl groups; and (b) an ethylene acid copolymer consisting essentially of copolymerized comonomers of ethylene and from 18 to 24 weight % of copolymerized comonomers of at least one $C_3$ to $C_8$ $\alpha,\beta$ ethylenically unsaturated carboxylic acid, based on the total weight of the ethylene acid copolymer, having a melt index from about 200 to about 600 g/10 minutes measured according to ASTM D1238 at 190° C. using a 2160 g weight;

wherein the combined acid moieties of (a) and (b) are nominally neutralized to a level from about 120% to about 200%; and optionally (c) filler.

DETAILED DESCRIPTION OF THE INVENTION

The following definitions apply to the terms as used throughout this specification, unless otherwise limited in specific instances.

The technical and scientific terms used herein have the meanings that are commonly understood by one of ordinary skill in the art to which this invention belongs. In case of conflict, the present specification, including the definitions herein, will control.

As used herein, the terms "comprises," "comprising," "includes," "including," "containing," "characterized by,"

"has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

The transitional phrase "consisting of" excludes any element, step, or ingredient not specified in the claim, closing the claim to the inclusion of materials other than those recited except for impurities ordinarily associated therewith. When the phrase "consists of" appears in a clause of the body of a claim, rather than immediately following the preamble, it limits only the element set forth in that clause; other elements are not excluded from the claim as a whole.

The transitional phrase "consisting essentially of" limits the scope of a claim to the specified materials or steps and those that do not materially affect the basic and novel characteristic(s) of the claimed invention. A 'consisting essentially of' claim occupies a middle ground between closed claims that are written in a 'consisting of' format and fully open claims that are drafted in a 'comprising' format. Optional additives as defined herein, at levels that are appropriate for such additives, and minor impurities are not excluded from a composition by the term "consisting essentially of".

When a composition, a process, a structure, or a portion of a composition, a process, or a structure, is described herein using an open-ended term such as "comprising," unless otherwise stated the description also includes an embodiment that "consists essentially of" or "consists of" the elements of the composition, the process, the structure, or the portion of the composition, the process, or the structure.

The articles "a" and "an" may be employed in connection with various elements and components of compositions, processes or structures described herein. This is merely for convenience and to give a general sense of the compositions, processes or structures. Such a description includes "one or at least one" of the elements or components. Moreover, as used herein, the singular articles also include a description of a plurality of elements or components, unless it is apparent from a specific context that the plural is excluded.

The term "or", as used herein, is inclusive; that is, the phrase "A or B" means "A, B, or both A and B". More specifically, a condition "A or B" is satisfied by any one of the following: A is true (or present) and B is false (or not present); A is false (or not present) and B is true (or present); or both A and B are true (or present). Exclusive "or" is designated herein by terms such as "either A or B" and "one of A or B", for example.

The term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such.

Unless stated otherwise, all percentages, parts, ratios, and like amounts, are defined by weight. In addition, the ranges set forth herein include their endpoints unless expressly stated otherwise. Further, when an amount, concentration, or other value or parameter is given as a range, one or more preferable ranges or a list of upper preferable values and lower preferable values, this is to be understood as specifically disclosing all ranges formed from any pair of any upper range limit or preferred value and any lower range limit or preferred value, regardless of whether such pairs are separately disclosed. The scope of the invention is not limited to the specific values recited when defining a range.

When materials, methods, or machinery are described herein with the term "known to those of skill in the art", "conventional" or a synonymous word or phrase, the term signifies that materials, methods, and machinery that are conventional at the time of filing the present application are encompassed by this description. Also encompassed are materials, methods, and machinery that are not presently conventional, but that will have become recognized in the art as suitable for a similar purpose.

As used herein, the term "copolymer" refers to polymers comprising copolymerized units resulting from copolymerization of two or more comonomers. In this connection, a copolymer may be described herein with reference to its constituent comonomers or to the amounts of its constituent comonomers, for example "a copolymer comprising ethylene and 18 weight % of acrylic acid", or a similar description. Such a description may be considered informal in that it does not refer to the comonomers as copolymerized units; in that it does not include a conventional nomenclature for the copolymer, for example International Union of Pure and Applied Chemistry (IUPAC) nomenclature; in that it does not use product-by-process terminology; or for another reason. As used herein, however, a description of a copolymer with reference to its constituent comonomers or to the amounts of its constituent comonomers means that the copolymer contains copolymerized units (in the specified amounts when specified) of the specified comonomers. It follows as a corollary that a copolymer is not the product of a reaction mixture containing given comonomers in given amounts, unless expressly stated in limited circumstances to be such. The term "dipolymer" refers to polymers consisting essentially of two monomers.

Provided herein are thermoplastic compositions having a coefficient of restitution (COR) greater than 0.870. Preferred thermoplastic compositions include an organic acid or a salt of an organic acid, an ionomer of an acid copolymer, and, optionally, a filler. When the thermoplastic composition comprises a filler, however, its COR is greater than 0.830, greater than 0.845, or greater than 0.850, for reasons discussed at length below.

Acid Copolymers

The acid copolymers used to make the thermoplastic compositions described herein are preferably "direct" acid copolymers. In "direct" copolymers, the copolymerized monomers are part of the polymer backbone or chain. In contrast, in graft copolymers, another comonomer is attached to non-terminal repeat units in an existing polymer chain, often by a subsequent free radical reaction.

When combined with other components as described herein, an ethylene dipolymer consisting essentially of copolymerized comonomers of ethylene and from about 18 to about 24 weight % of copolymerized comonomers of $C_3$ to $C_8$ $\alpha,\beta$ ethylenically unsaturated carboxylic acid is particularly useful for preparing thermoplastic compositions having coefficients of restitution greater than 0.830 or 0.845 or 0.850, if the thermoplastic composition further comprises a filler, or greater than 0.860 or 0.870, if the thermoplastic composition is unfilled. Preferably, the dipolymer may include about 19 to about 21 weight % of the copolymerized carboxylic acid.

Preferred are dipolymers and compositions comprising the dipolymers wherein the copolymerized comonomers of $C_3$ to $C_8$ $\alpha,\beta$ ethylenically unsaturated carboxylic acid are acrylic acid or methacrylic acid. Specific acid copolymers include ethylene/acrylic acid dipolymers and ethylene/methacrylic acid dipolymers. More preferably, the dipolymer may include 19 to 20 weight % of copolymerized methacrylic acid, or about 21 weight % of copolymerized acrylic acid.

Ethylene/acrylic acid dipolymers are of note because acrylic acid will provide more acid moieties than an equal weight of methacrylic acid.

Ethylene acid dipolymers with high levels of acid may be prepared through the use of "co-solvent technology" as described in U.S. Pat. No. 5,028,674 or by employing somewhat higher pressures than those at which copolymers with lower acid levels may be prepared.

The dipolymer resins have melt index flow rates in the range of about 200 g/10 min to about 600 g/10 min, or greater, at 190° C. using a 2160 g weight, such as dipolymer resins having melt index flow rates from about 300 g/10 min to about 550 g/10 min at 190° C. using a 2160 g weight.

Ionomers

Unmodified, melt processable ionomers may be prepared from acid copolymers described above by methods known in the art. By "unmodified", it is meant that the ionomers are not blended with any material that has been added for the purpose of modifying the properties of the unblended ionomer. Ionomers include partially neutralized acid copolymers, particularly copolymers prepared from copolymerization of ethylene and acrylic acid or methacrylic acid. The unmodified ionomers may be neutralized to any level that does not result in an intractable (not melt processable) polymer that does not have useful physical properties. Preferably, about 15 to about 90%, more preferably about 50 to about 75% of the acid moieties of the acid copolymer are neutralized to form carboxylate groups. Preferred counterions for the carboxylate groups include alkali metal cations, alkaline earth metal cations, transition metal cations, and combinations of two or more of these metal cations.

More specifically, cations useful in the unmodified ionomers include lithium, sodium, potassium, magnesium, calcium, barium, or zinc, or combinations of two or more of these cations. Magnesium cations or calcium cations are preferred.

Organic Acids and Salts

Suitable organic acids include, without limitation, aliphatic, monofunctional organic acids having 4 to 36 carbon atoms, wherein the longest carbon chain may optionally be substituted with from one to three substituents independently selected from $C_1$ to $C_8$ alkyl groups. The organic acids may be saturated or unsaturated, and, if unsaturated, may include more than one carbon-carbon double bond. The term "monofunctional" refers to acids with one carboxylic acid moiety. Suitable organic acids include $C_4$ to $C_{36}$ (for example $C_{18}$), more particularly $C_6$ to $C_{26}$, and even more particularly $C_6$ or $C_{12}$ or $C_{16}$ to $C_{24}$ acids.

Specific examples of suitable organic acids include, but are not limited to, caproic acid, caprylic acid, capric acid, lauric acid, stearic acid, isostearic acid, behenic acid, erucic acid, oleic acid, iso-oleic acid, and linoleic acid. Naturally derived organic fatty acids such as palmitic, stearic, oleic, erucic, behenic acids, and mixtures thereof may also be employed.

As is well known in the art, commercial grades of organic acids may include a number of structurally different organic acids of varying lesser amounts. As used herein, unless otherwise specified in limited circumstances, a composition that comprises a named acid may also include other acids that are present in commercial grades of the named acid, at levels that are proportional to their levels in the commercial grade. Furthermore, when the transitional term "consisting essentially of" is applied to compositions that comprise a named acid, other acids that are present in commercial grades of the named acid, at levels that are proportional to their levels in the commercial grade, are not excluded from the composition.

Saturated acids of note include stearic acid and behenic acid. Saturated linear organic acids (such as stearic acid and behenic acid) are acids comprising only one $CH_3$ (methyl) and no CH (methenyl) moieties.

Unsaturated linear organic acids (for example oleic acid and erucic acid) are acids that have only one $CH_3$ moiety and at least one carbon-carbon double bond. They include any number of $CH_2$ (methylene) groups, within the carbon count limits set forth above. Monounsaturated acids contain one carbon-carbon double bond. Of note are linear, unsaturated (including multi-unsaturated) organic acids having from 16 to 24 carbon atoms, including but not limited to oleic acid, erucic acid and linoleic acid. Naturally derived organic fatty acids such as (notably) oleic acid, and mixtures thereof, may be used. Oleic acid is commercially available under the tradenames INDUSTRENE 106 or INDUSTRENE 206 (PMC Biogenix of Middlebury, Conn.) or PRIOLENE 6900 or PRIOLENE 6910 (Croda Uniqema of New Castle, Del.).

Acids wherein the longest carbon chain of the acid is substituted with from one to three $C_1$ to $C_8$ alkyl substituents, preferably methyl groups, are referred to herein as branched acids. Saturated, branched organic acids are acids comprising at least one CH (methenyl) moiety and at least two $CH_3$ (methyl) moieties. Of note are saturated, branched organic acids wherein the longest carbon chain of the acid is substituted with one $C_1$ to $C_8$ alkyl group. Also of note is a saturated, branched organic acid, preferably having from 6 to 24 carbon atoms, such as the $C_{18}$ saturated branched organic acid isostearic acid, also known as isooctadecanoic acid or 16-methyl-heptadecanoic acid.

Unsaturated branched acids are acids comprising at least one carbon-carbon double bond, at least two $CH_3$ (methyl) moieties and at least one CH (methenyl) moiety. They may include any number of $CH_2$ (methylene) groups, within the molecular weight limits set forth above. Of note are unsaturated, branched organic acids wherein the longest carbon chain of the acid is substituted with one $C_1$ to $C_8$ alkyl group. Also of note is an unsaturated, branched organic acid, preferably having from 6 to 24 carbon atoms, such as the $C_{18}$ monounsaturated methyl-branched organic acid known as iso-oleic acid.

While it may be useful for the organic acids (and salts) to have a low volatility when being melt-blended with the acid copolymer or ionomer, volatility has been found to not be limiting when preparing blends with high nominal neutralization levels, particularly above 100%. At 100% nominal neutralization (i.e., sufficient basic compound is added such that all acid moieties in the copolymer and organic acid are nominally neutralized), or when the use of an excess of neutralizing agent results in a nominal neutralization level that is even greater than 100%, the volatility of these components is not significant. Accordingly, organic acids with lower molecular weights, such as $C_4$ and $C_6$ acids, may be used. It is preferred, however, that the organic acid (or salt) be non-volatile and non-migratory. By non-volatile, it is meant that they do not evaporate or sublimate significantly at temperatures of melt blending of the organic acid with the acid copolymer or ionomer. By non-migratory, it is meant that the acid does not bloom to the surface of the polymeric article under normal storage conditions at ambient temperatures.

Preferably the organic acids are present in about 5 weight % to about 60 weight %, and more preferably, from about 30 to about 50 weight % or from about 35 to about 46 weight % of the total weight of ionomer and organic acid salt, based on the amount of organic acid added to the composition in its non-neutralized or free-acid form. It is understood that the upper limits of these weight percentages may be exceeded, if substantially all of the organic acids are neutralized to form salts.

Suitable and preferred cations for the organic acid salts are as set forth above with respect to ionomers. Again, magnesium salts or calcium salts are preferred.

Process for Making the Ionomer Composition

The melt-processible, modified ionomer blends may be produced by heating a mixture of the carboxylic acid copolymer(s) or ionomer(s), the organic acid(s) or salt(s) thereof, and at least one basic compound capable of neutralizing the combined acid moieties of the acid copolymer and the organic acid. For example, the components of the composition may be mixed by (a) Melt-blending ethylene α,β-ethylenically unsaturated $C_{3-8}$ carboxylic acid copolymer(s) or ionomer(s) thereof as described above that are not neutralized to a level that renders them intractable (not melt-processible) with one or more organic acids as described above or salts thereof, and concurrently or subsequently (b) Adding an amount of a basic compound capable of neutralization of the acid moieties in the acid copolymer and in the organic acid that is sufficient to achieve nominal neutralization levels of about 120% to about 200% or above.

This procedure need not employ an inert diluent such as a solvent. Treatment of acid copolymers and organic acids with basic compounds in this way enables the compositions described herein to be neutralized to a level higher than that which would result in loss of melt processibility and properties for the ionomer alone. For example, an acid copolymer blended with organic acid(s) may be nominally neutralized to a level of over 120% without losing melt processibility. Also, nominal neutralization over 120% reduces the volatility of the organic acids.

Alternatively, the acid copolymer(s) or unmodified, melt-processible ionomer(s) may be melt-blended with the organic acid(s) or salt(s) and other polymers in any manner known in the art. For example, a salt and pepper blend of the components may be made and then melt-blended in an extruder.

The melt-processible, acid copolymer/organic-acid-or-salt blend may be treated with the basic compound by methods known in the art, such as melt-mixing. For example, a Werner & Pfleiderer twin-screw extruder may be used to mix the acid copolymer and the organic acid and treat with the basic compound at the same time. It is desirable that the mixing be conducted so that the components are intimately mixed, allowing the basic compound to neutralize the acidic moieties.

The amount of base required to neutralize the acidic groups in the acid copolymer and the organic acid(s) may be determined by stoichiometric principles. The amount of acid moieties in the acid copolymer and organic acid(s) in the blend that is targeted for reaction with the base is referred to herein as "% nominal neutralization" or "% nominally neutralized". Thus, sufficient basic compound is made available in the blend so that, in aggregate, the indicated level of nominal neutralization may be achieved. Of note are nominal neutralization levels of about 120% to about 150%, about 150% to about 180%, or about 150% to about 200%.

Suitable basic compounds include compounds of alkali metals, such as lithium, sodium or potassium, transition metal ions and/or alkaline earth metal and mixtures or combinations of such cations. They include formates, acetates, nitrates, hydrogencarbonates, carbonates, oxides, hydroxides or alkoxides of the ions of alkali metals, and formates, acetates, nitrates, oxides, hydroxides or alkoxides of the ions of alkaline earth metals and transition metals. Basic compounds with magnesium or calcium ions, such as the corresponding formate, acetate, hydroxide, oxide, alkoxide, etc., including magnesium hydroxide, are of note.

It is desirable to run the blending/neutralization process with an extruder equipped with a vacuum port to remove any excess volatiles including moisture. Moisture may have a negative impact on subsequent molding operations in that excess moisture and volatiles may create unwanted foaming and voids in the molded article.

Of note is the composition wherein the overall salt of the composition ("overall salt" is a number of moles that is equal to the total number of moles of carboxylate anions) comprises at least about 75 equivalent % magnesium counterions or calcium counterions. While other cations may be present, the equivalent percentage of magnesium salts or calcium salts in the final blended ionomeric composition is preferably at least about 75 equivalent %, more preferably at least about 80 equivalent %, and most preferably at least about 90 equivalent % based on the total salt present in the blended composition.

The basic compound(s) may be added neat to the acid copolymer or ionomer thereof and the organic acid or salt thereof. The basic compound(s) may also be premixed with a polymeric material such as an acid copolymer, to form a "masterbatch" that may be added to the acid copolymer or ionomer thereof and the organic acid or salt thereof. A notable masterbatch comprising about 40 to 60 weight % of a copolymer of ethylene, acrylic acid or methacrylic acid, and optionally an alkyl acrylate wherein the alkyl group has from 1 to 4 carbon atoms; and about 40 to 60 weight % of a basic compound as described above (e.g., $Mg(OH)_2$). Also of note are compositions comprising or prepared from master batches. A preferred composition comprising or prepared from a master batch includes (1) about 30 to about 50 weight % of at least one aliphatic, unsaturated organic acid having from 16 to 22 carbon atoms;

(2) either (a) about 30 to about 60 weight % an ethylene acid copolymer consisting essentially of ethylene and from 18 to 24 weight % of copolymerized comonomers of acrylic acid or methacrylic acid based on the total weight of the ethylene acid copolymer, having a melt index from about 200 to about 600 g/10 minutes;

or (b) about 30 to about 60 weight % an ethylene acid copolymer consisting essentially of ethylene and from 18 to 24 weight % of copolymerized comonomers of acrylic acid or methacrylic acid based on the total weight of the ethylene acid copolymer, having a melt index from about 50 to about 200 g/10 minutes;

(3) about 5 to about 15 weight % of a copolymer of ethylene, 5 to 10 weight % of acrylic acid or methacrylic acid based on the total weight of the copolymer, and 15 to 30 weight % of an alkyl acrylate wherein the alkyl group has from 1 to 4 carbon atoms (such as butyl acrylate) based on the total weight of the copolymer; wherein the amounts of (1) and (2) and (3) are based on the total weight of the composition; and wherein the combined acid moieties of (1) and (2) and (3) are nominally neutralized to a level from about 120% to about 200%.

Other Components

The compositions may additionally comprise small amounts of optional materials including additives for use in polymeric materials. Examples of suitable additives include, without limitation, plasticizers, stabilizers including viscosity stabilizers and hydrolytic stabilizers, primary and secondary antioxidants such as for example IRGANOX 1010, ultraviolet ray absorbers and stabilizers, anti-static agents, dyes, pigments or other coloring agents, fire-retardants, lubricants, processing aids, slip additives, antiblock agents such as silica or talc, release agents, and/or mixtures thereof. Additional optional additives may include inorganic fillers as described below; acid copolymer waxes, such as for example Honeywell wax AC540; $TiO_2$, which is used as a whitening agent; optical brighteners; surfactants; and other components known in the art of golf ball manufacture to be useful but not critical to golf ball performance and/or acceptance. Many such additives are described in the Kirk Othmer *Encyclopedia of Chemical Technology*, 5$^{th}$ edition, John Wiley & Sons (Hoboken, 2005).

These additives may be present in the compositions in quantities that may be from 0.01 to 15 weight %, preferably from 0.01 to 10 weight %, or from 0.01 to 5 weight % of the total composition, so long as they do not detract from the basic and novel characteristics of the composition and do not significantly adversely affect the performance of the composition or golf ball prepared from the composition.

The optional incorporation of such conventional ingredients into the compositions may be carried out by any known process, for example, by dry blending, by extruding a mixture of the various constituents, by the conventional masterbatch technique, or the like.

Filler

Various optional fillers may be added to compositions to reduce cost, to affect rheological, mixing and physical properties such as density, flex modulus, hardness (e.g. Shore D), and/or melt flow index and the like, to increase or decrease weight, and/or to reinforce the material. The amount of filler employed is primarily a function of weight requirements and weight distribution of the golf ball. The fillers may be used to adjust the properties of a golf ball layer, reinforce the layer, or for any other purpose.

For example, the compositions may be reinforced by blending with a wide range of density-adjusting fillers, e.g., ceramics, glass spheres (solid or hollow, and filled or unfilled), and fibers, inorganic particles, and metal particles, such as metal flakes, metallic powders, oxides, and derivatives thereof, as is known in the art.

Fillers may be used to modify the weight of the golf ball to meet required limits, by imparting additional density to compositions of the previously described components. Filler may be included in one or more layers of the golf ball, such as the core or intermediate layer(s), the selection being dependent upon the type of golf ball desired (i.e., two-piece, wound or multilayer), as more fully detailed below.

The filler may be inorganic, having a density from about 4 grams/cubic centimeter (g/cc), or from about 5 g/cc, to about 10 g/cc or higher and may be present in amounts between 0 and about 60 weight % based on the total weight of the composition. Examples of useful fillers include metals such as titanium, tungsten, aluminum, bismuth, nickel, molybdenum, iron, steel, lead, copper, brass, boron, boron carbide whiskers, bronze, cobalt, beryllium, zinc, tin, metal oxides including zinc oxide, iron oxide, aluminum oxide, tin oxide, titanium oxide, magnesium oxide, zinc oxide and zirconium oxide, as well as other well known corresponding salts and oxides thereof. Other preferred fillers include barium sulfate, lead silicate, tungsten carbide, limestone (ground calcium/magnesium carbonate), zinc sulfate, calcium carbonate, zinc carbonate, barium carbonate, clay, tungsten, silicas, and mixtures of any of these. Preferably the filler material is non-reactive or almost non-reactive. Of note are barium sulfate and tungsten powder fillers. Crystalline tungsten powder having a specific gravity of about 19.3 g/cc is available from Alldyne Powder Technologies, Kulite Tungsten Corporation or Buffalo Tungsten Incorporated.

Fillers may be employed in a finely divided form, for example, in a size less than about 20 mesh U.S. standard size, preferably from about 100 mesh to about 1000 mesh, except for fibers and flock, which may be elongated. Flock and fiber sizes are desirably small enough to facilitate processing. Filler particle size may depend upon desired effect, cost, ease of addition, and dusting considerations.

When filler is used in a particular composition, the coefficient of restitution (COR), as described below, will decrease approximately proportionally to the volumetric displacement of the polymer by the filler. For example, if 5 volume % of filler is used to provide a desired specific gravity, then the COR of a sphere made from the filled composition may be about 95% of the COR of a comparable sphere made from the unfilled composition.

When tungsten is used as a filler with the compositions described herein, the COR of a sphere of about 1.53 inches in diameter may decrease about 0.015 to 0.020 compared to a sphere of the same size prepared from the corresponding unfilled composition, depending on the amount of tungsten that is present in the filled composition. Accordingly, thermoplastic compositions provided herein, when comprising a filler, have a COR that is greater than 0.830, greater than 0.845, or greater than 0.850.

Of note is a composition and a golf ball comprising or prepared from the composition wherein the composition comprises or is prepared from:

90 to 99.9 volume %, 95 to 99.9 volume %, or 97 to 99.9 volume % of a blend comprising (1) about 30 to about 50 weight % of at least one aliphatic, unsaturated organic acid having from 16 to 22 carbon atoms;

(2) either (a) about 30 to about 60 weight % an ethylene acid copolymer consisting essentially of ethylene and from 18 to 24 weight % of copolymerized comonomers of acrylic acid or methacrylic acid based on the total weight of the ethylene acid copolymer, having a melt index from about 200 to about 600 g/10 minutes;

or (b) about 30 to about 60 weight % an ethylene acid copolymer consisting essentially of ethylene and from 18 to 24 weight % of copolymerized comonomers of acrylic acid or methacrylic acid based on the total weight of the ethylene acid copolymer, having a melt index from about 50 to about 200 g/10 minutes;

(3) about 5 to about 15 weight % of a copolymer of ethylene, 5 to 10 weight % of acrylic acid or methacrylic acid based on the total weight of the copolymer, and 15 to 30 weight % of an alkyl acrylate wherein the alkyl group has from 1 to 4 carbon atoms (such as butyl acrylate) based on the total weight of the copolymer;

wherein the amounts of (1), (2) and (3) are based on the total weight of the blend and the combined acid moieties of (1) and (2) and (3) are nominally neutralized to a level from about 120% to about 200%;

and optionally 0.1 to 10, 0.1 to 5, or 0.1 to 3 volume % of filler.

Blowing or Foaming Agents

The compositions may be foamed by the addition of at least one physical or chemical blowing or foaming agent or by blending with polymeric, ceramic, metal, and glass microspheres. The use of a foamed polymer allows the golf ball designer to adjust the density or mass distribution of the ball to adjust the angular moment of inertia, and thus, the spin rate and performance of the ball. Foamed materials also offer a potential cost savings due to the reduced use of polymeric material.

Useful blowing or foaming agents include but are not limited to organic blowing agents, such as azobisformamide; azobisisobutyronitrile; diazoaminobenzene; N,N-dimethyl-N,N-dinitroso terephthalamide; N,N-dinitrosopentamethylene-tetramine; benzenesulfonyl-hydrazide; benzene-1,3-disulfonyl hydrazide; diphenylsulfon-3-3, disulfonyl hydrazide; 4,4'-oxybis benzene sulfonyl hydrazide; p-toluene sulfonyl semicarbizide; barium azodicarboxylate; butylamine nitrile; nitroureas; trihydrazino triazine; phenyl-methyl-uranthan; p-sulfonhydrazide; peroxides; and inorganic blowing agents such as ammonium bicarbonate and sodium bicarbonate. A gas, such as air, nitrogen, carbon dioxide, etc., may also be injected into the composition during the injection molding process.

A foamed composition may be formed by blending microspheres with the composition either during or before the molding process. Polymeric, ceramic, metal, and glass microspheres up to about 1000 micrometers in diameter are useful, and may be solid or hollow and filled or unfilled.

Of note is an article comprising a foamed composition, such as a ball comprising a core or center prepared from the foamed composition. In addition to golf balls, such balls include baseballs and softballs. Either injection molding or compression molding may be used to form a layer or a core including a foamed polymeric material.

The compositions described herein may be injection molded or compression molded into various shaped articles, including cores or intermediate layers for golf balls as described below. For example but not limitation, injection molding conditions may include temperatures, pressures and cycle times as indicated in Table A.

TABLE A

| | Temperature (° C.) | Injection Pressure (mPa) | Cycle Times (sec) |
|---|---|---|---|
| Melt | 160-260 | Packing 25-180 | Filling and Packing 40-90 |
| Mold | 10-30 | Hold 5-15 | Hold 15-30 |
| Front/Back | | | Cooling Time 50-100 |
| | | | Screw Retraction 5-50 |

Golf Ball Construction

The compositions described herein may be used with any type of ball construction. Golf balls may be divided into two general classes: wound and solid. Wound golf balls may include a solid, hollow, or fluid-filled center or core, surrounded by windings of a tensioned elastomeric thread-like material, and a cover. Since early wound balls had three parts (center, windings and cover), wound balls also may be referred to as "three-piece" balls, even if additional layers are present. Solid golf balls include one-piece, two-piece (i.e., solid core and a cover), and multilayer (i.e., a core of one or more layers, one or more intermediate layers and/or a cover of one or more layers) golf balls. As used herein, the term "solid golf ball" also includes a ball comprising a hollow or fluid-filled center surrounded by one or more of solid layers.

The golf ball may have an overall diameter of any size. United States Golf Association ("USGA") specifications limit the minimum size of a competition golf ball to 1.680 inches, but there is no specification of maximum diameter. Golf balls of any size, however, may be used for recreational play. The diameter of the present golf balls may be from 1.7 to about 1.95 inches, preferably from about 1.68 inches to about 1.80 inches, more preferably from about 1.68 inches to about 1.76 inches, and most preferably about 1.68 inches to about 1.74 inches. Preferably, the overall diameter of the core and all intermediate layers is about 80 percent to about 98 percent of the overall diameter of the finished ball.

Golf balls usually have surface contouring to affect their aerodynamic performance. The surface contouring may be embodied by a plurality of small, shallow depressions ("dimples") molded into the otherwise spherical surface of the golf ball. The use of various dimple patterns and profiles provides a relatively effective way to modify the aerodynamic characteristics of a golf ball. The dimples may be arranged in any one of a number of patterns to modify the flight characteristics of the balls. For example, the surface contouring of the golf ball may be a conventional dimple pattern such as disclosed in U.S. Pat. No. 6,213,898, an icosahedron-based pattern such as described in U.S. Pat. No. 4,560,168, or an octahedral-based dimple pattern as described in U.S. Pat. No. 4,960,281. Examples of dimple patterns include the following.

The golf ball may have an icosahedron dimple pattern that includes 20 triangles made from about 362 dimples and, except perhaps for the mold parting line, does not have a great circle that does not intersect any dimples. Each of the large triangles, preferably, has an odd number of dimples (7) along each side and the small triangles have an even number of dimples (4) along each side. To properly pack the dimples, the large triangle has nine more dimples than the small triangle. The ball may have five different sizes of dimples in total. The sides of the large triangle may have four different sizes of dimples and the small triangles have two different sizes of dimples.

The golf ball may have an icosahedron dimple pattern with a large triangle including three different dimples and the small triangles having only one diameter of dimple. There may be 392 dimples and one great circle that does not intersect any dimples. More than five alternative dimple diameters may be used.

The golf ball may have an octahedron dimple pattern including eight triangles made from about 440 dimples and three great circles that do not intersect any dimples. In the octahedron pattern, the pattern includes a third set of dimples formed in a smallest triangle inside of and adjacent to the small triangle. To properly pack the dimples, the large triangle has nine more dimples than the small triangle and the small triangle has nine more dimples than the smallest triangle. The ball has six different dimple diameters distributed over the surface of the ball. The large triangle has five different dimple diameters, the small triangle has three different dimple diameters and the smallest triangle has two different dimple diameters.

Alternatively, the dimple pattern may be arranged according to phyllotactic patterns, such as described in U.S. Pat. No. 6,338,684. Dimple patterns may also be based on Archimedean patterns including a truncated octahedron, a great rhombcuboctahedron, a truncated dodecahedron, and a great rhombicosidodecahedron, wherein the pattern has a non-linear parting line, as disclosed in U.S. application Ser. No. 10/078,417. Another dimple pattern, consisting of a plurality of dimples of various sizes for providing an optimum impact at the moment of hitting the golf ball, is disclosed in US Patent Appln. Publn. No. 2006/0276267. The golf balls may also be covered with non-circular amorphous shaped dimples, as disclosed in U.S. Pat. No. 6,409,615.

Dimple patterns that provide a high percentage of surface coverage are preferred, and are well known in the art. For example, U.S. Pat. Nos. 5,562,552, 5,575,477, 5,957,787, 5,249,804, and 4,925,193 disclose geometric patterns for positioning dimples on a golf ball. The golf balls may have a dimple coverage of the surface area of the cover of at least about 60 percent, or at least about 65 percent, or at least 70 percent or greater. Dimple patterns having even higher dimple coverage values may also be used. Thus, the golf balls may have dimple coverage of at least about 75 percent or greater, about 80 percent or greater, or even about 85 percent or greater.

Several additional non-limiting examples of dimple patterns with varying sizes of dimples are also provided in U.S. patent application Ser. No. 09/404,164 and U.S. Pat. No. 6,213,898.

The total number of dimples on the ball, or dimple count, may vary depending on such factors as the sizes of the dimples and the pattern selected. The total number of dimples on the ball may be between about 100 to about 1000 dimples, although one skilled in the art would recognize that differing dimple counts within this range may significantly alter the flight performance of the ball. For example, the dimple count may be about 380 dimples or greater, or about 400 dimples or greater, or about 420 dimples or greater, such as about 422 dimples. In some cases, it may be desirable to have fewer dimples on the ball, for example a dimple count of about 380 dimples or less or about 350 dimples or less.

Dimple profiles revolving a catenary curve about its symmetrical axis may increase aerodynamic efficiency, provide a convenient way to alter the dimples to adjust ball performance without changing the dimple pattern, and result in uniformly increased flight distance for golfers of all swing speeds. Thus, catenary curve dimple profiles, as disclosed in U.S. patent application Ser. No. 09/989,191 may be used.

Alternatively, the surface contouring of the golf ball may have a non-dimple pattern such as a tubular lattice pattern, such as the one disclosed in U.S. Pat. No. 6,290,615.

Any surface contouring or dimple pattern is contemplated for the golf balls described herein and is not limited to the dimple patterns disclosed in these references.

Most golf balls comprise concentric layers of materials in their construction. Golf balls wherein at least one layer of the golf ball comprises the composition described herein are contemplated. For example, the composition may be used in cores or centers of two-piece, wound, and multilayer golf ball designs, including golf balls having double cores (a core comprising two parts or layers such as an inner core and an outer core), intermediate layer(s), and/or double covers (a cover comprising two parts or layers such as an inner cover and an outer cover). As known to those of ordinary skill in the art, the type of golf ball constructed, i.e., double core, double cover, and the like, depends on the type of performance desired of the ball. As used herein, the term "layer" includes any substantially spherical or spherically symmetrical portion of a golf ball, i.e., a core or center, an intermediate layer, and/or a cover. As used herein, the term "inner layer" refers to any golf ball layer beneath the outermost structural layer of the golf ball. The ball may be coated, e.g. with a urethane lacquer, painted or otherwise finished for appearance purposes, but such a coating, painting and/or finishing generally does not have a significant effect on the performance characteristics of the ball. Therefore, coatings, paint layers, top coats, finishes or the like applied to the surface or cover of a golf ball are not within the meaning of the term "layer" or "structural layer" as used herein. As used herein, the term "multilayer" without specifying a number refers to a golf ball with at least three structural layers comprising a core, intermediate layer and cover.

The outermost structural layer of a golf ball is known as the cover, and it provides the interface between the ball and a club. Properties that are desirable for the cover are good moldability, high abrasion resistance, high tear strength, high resilience, and good mold release, among others.

Covers may be made from any conventional golf ball cover material such as ionomer resin, balata rubber or thermoset/thermoplastic polyurethanes and the like and include the surface contouring or dimple pattern. The covers may be made by injection or compression molding a cover composition over a thermoplastic or thermoset core for a two-piece golf ball, over windings around a thermoplastic or thermoset center for a wound golf ball, or as the outermost layer of a multilayer golf ball.

The cover has a thickness to provide sufficient strength, good performance characteristics, and durability. For example, cover layers may be from about 0.005 inch to about 0.35 inch in thickness, or from about 0.02 inches to about 0.35 inches. The cover may have a thickness of about 0.02 inches to about 0.12 inches, or about 0.1 inches or less. An outer cover layer may have a thickness from about 0.02 inches to about 0.07 inches or about 0.05 inches or less, such as about 0.02 inches to about 0.05 inches, about 0.02 inches to about 0.045 inches, about 0.025 to about 0.04 inches, or about 0.03 inches thick.

Prepolymers used for polyurethane covers are produced by combining at least one polyol, such as a polyether, polycaprolactone, polycarbonate or a polyester, and at least one isocyanate. Thermoset polyurethanes are obtained by curing at least one polyurethane prepolymer with a curing agent selected from a polyamine, triol or tetraol. Thermoplastic polyurethanes are obtained by curing at least one polyurethane prepolymer with a diol curing agent. The choice of the curatives may be important because some urethane elastomers that are cured with a diol and/or blends of diols may not produce urethane elastomers with the impact resistance desired in a golf ball cover. Blending polyamine curatives with diol-cured urethane elastomeric formulations may provide thermoset urethanes with improved impact and cut resistance.

As discussed elsewhere herein, the cover composition may be molded onto the golf ball in any known manner, such as by casting, compression molding, injection molding, reaction injection molding, or the like. One skilled in the art would appreciate that the molding method used may be determined at least partially by the properties of the composition. For example, casting may be preferred when the material is thermoset, whereas compression molding or injection molding may be preferred for thermoplastic compositions.

The innermost layer of the golf ball is known as the center or core. The core may be solid, semi-solid, hollow, filled with a fluid, such as a gas or liquid, powder-filled, or have a metal layer. It may be a one-piece or multi-component core. The term "semi-solid" as used herein refers to a paste, a gel, or the like. Any core material known to one of ordinary skill in that art is suitable for use in the golf balls of the invention. Suitable core materials include thermoset materials, such as rubber, styrene butadiene, polybutadiene, isoprene, polyisoprene, trans-isoprene, and thermoplastics such as ionomer resins, polyamides or polyesters, and thermoplastic and thermoset polyurethane or polyurea elastomers. Preferably, the core may be prepared from a composition as described herein.

A solid core is prepared from a composition that is injection-molded or compression-molded into a substantially spherical or spherically symmetrical solid. Cores may be spherical or they may have a more complex spherically symmetrical shape (for example, comprising a central portion and a plurality of projections and/or depressions). For example but not limitation, cores with complex shapes are disclosed in US Patent Application Publication No. 2004/0209705. The core may be surface treated by plasma treatment, corona discharge, chemical treatment or mechanically treated.

The core has an average diameter such that the thickness of the cover and any additional layers may be added to the diameter of the core to provide a golf ball of desired size, for example, at least about 1.68 inches in diameter. The core of the golf ball may also be extremely large in relation to the rest of the ball. For example, the core may make up about 90% to about 98% of the ball, or about 94% to about 96% of the ball. The diameter of the core may be about 1.54 inches or greater, about 1.55 inches or greater, about 1.59 inches or greater, or about 1.64 inches or less. The core may have an average diameter from about 0.09 inches to about 1.65 inches, about 1.2 inches to about 1.630 inches, about 1.3 inches to about 1.6 inches, about 1.39 inches to about 1.6 inches, about 1.5 inches to about 1.6 inches, or about 1.55 inches to about 1.65 inches.

When the core includes an inner core layer and an outer core layer, the inner core layer may be preferably about 0.9 inches or greater and the outer core layer preferably has a thickness of about 0.1 inches or greater. The inner core layer may have a diameter from about 0.09 inches to about 1.2 inches and the outer core layer may have a thickness from about 0.1 inches to about 0.8 inches. The inner core layer diameter may be from about 0.095 inches to about 1.1 inches and the outer core layer may have a thickness of about 0.20 inches to about 0.03 inches.

Conventional core materials may include a base rubber, including natural or synthetic rubbers, a crosslinking agent, a filler, and a co-crosslinking or initiator agent. An example base rubber is 1,4-polybutadiene having a cis-structure of at least 40%. Preferably, the base rubber comprises high-Mooney-viscosity rubber. If desired, the polybutadiene may also be mixed with other elastomers known in the art such as natural rubber, polyisoprene rubber and/or styrene-butadiene rubber in order to modify the properties of the core. The crosslinking agent may include a metal salt of an unsaturated fatty acid such as a zinc salt or a magnesium salt of an unsaturated fatty acid having 3 to 8 carbon atoms such as acrylic or methacrylic acid. Suitable crosslinking agents include metal salt diacrylates, dimethacrylates and monomethacrylates wherein the metal is magnesium, calcium, zinc, aluminum, sodium, lithium or nickel. The crosslinking agent may be present in an amount from about 15 to about 30 parts per hundred of the rubber, preferably from about 19 to about 25 parts per hundred of the rubber and most preferably about 20 to 24 parts crosslinking agent per hundred of rubber. The core compositions may also include at least one organic or inorganic cis-trans catalyst to convert a portion of the cis-isomer of polybutadiene to the trans-isomer, as desired. The initiator agent may be any known polymerization initiator which decomposes during the cure cycle. Suitable initiators include peroxide compounds such as dicumyl peroxide, 1,1-di-(t-butylperoxy)-3,3,5-trimethyl cyclohexane, α-α bis-(t-butylperoxy)-diisopropylbenzene, 2,5-dimethyl-2,5 di-(t-butylperoxy)hexane or di-t-butyl peroxide and mixtures thereof.

Intermediate layers between the cover and the core also may be known as "mantles," "inner covers," "outer cores" "envelope layers" or "boundary layers." These intermediate layers may form a substantially spherical or spherically symmetrical shell around the core. For example, intermediate layers may have a plurality of projections and/or depressions that are complementary to any projections and/or depressions in the other layers of the golf ball, such as in the outer surface of the core and/or the inner face of the cover. "Mantle" or "boundary layer" may refer to a relatively thin layer, for example, from about 0.20 inch to about 0.075 inch in thickness, in contact with the inner face of the cover layer.

The intermediate layer may comprise ionomeric materials and/or non-ionomeric materials such as polyvinyl chloride, copolymers of vinyl chloride with vinyl acetate, acrylic esters or vinylidene chloride, polyolefins such as polyethylene, polypropylene, polybutylene copolymers and homopolymers produced using a single-site catalyst or a metallocene catalyst, polyphenylene ether, copolymers such as ethylene methylacrylate, ethylene ethylacrylate, ethylene vinyl acetate, ethylene methacrylic acid, ethylene acrylic acid, propylene acrylic acid, polyamides such as poly(hexamethylene adipamide) and others made from diamines and dibasic acids, and those from amino acids such as poly(caprolactam) and mixtures of any of the above, including polyamide/ionomer blends, polyphenylene ether/ionomer blends, etc. Other suitable materials include but are not limited to, thermoplastic or thermosetting polyurethanes, thermoplastic block polyesters, for example, a polyester elastomer such as that marketed by E.I. du Pont de Nemours & Co. of Wilmington, Del. ("DuPont") under the brand HYTREL, or thermoplastic block polyamides, for example, a polyether amide such as that marketed by Arkema S. A. of Paris, France, under the brand name PEBAX, a blend of two or more non-ionomeric thermoplastic elastomers, or a blend of one or more ionomers and one or more non-ionomeric thermoplastic elastomers. These materials may be blended with ionomers in order to reduce cost relative to the use of higher quantities of ionomer. Preferably, a mantle or intermediate layer may be prepared from a composition described herein.

The ionomer used in intermediate layers may include either so-called "low acid" and "high acid" ionomers of ethylene acid copolymers, as well as blends thereof. In general, ionomers prepared by neutralizing acid copolymers including up to about 15% of copolymerized acid residues based on the total weight of the unneutralized ethylene acid copolymer, are considered "low acid" ionomers, while those including greater than about 15% acid are considered "high acid" ionomers.

A low acid ionomer is believed to impart high spin. Thus, the intermediate layer may include a low acid ionomer where the acid is present in about 10 to 15 weight % and optionally includes a copolymerized softening comonomer, e.g., iso- or n-butylacrylate, to produce a softer terpolymer.

For low spin rate and maximum distance, the intermediate layer may include at least one high acid ionomer. In these high modulus ionomers, the acrylic or methacrylic acid is present in about 15 to about 35 weight %, such as about 16 weight %, or about 17 to about 25 weight %, or about 18.5 percent to about 21.5 weight % of a copolymerized carboxylic acid. An additional copolymerized comonomer may also be included to produce a softer terpolymer.

In either low acid ionomers or high acid ionomers, an additional comonomer may be selected from the group consisting of vinyl esters of aliphatic carboxylic acids wherein the acids have 2 to 10 carbon atoms, vinyl ethers wherein the alkyl groups contains 1 to 10 carbon atoms, and alkyl acrylates or methacrylates wherein the alkyl group contains 1 to 10 carbon atoms. Suitable softening comonomers include vinyl acetate, acrylate esters such as iso- or n-butylacrylate, methyl acrylate, methyl methacrylate, ethyl acrylate, ethyl methacrylate, butyl methacrylate, or the like.

Consequently, examples of a number of copolymers suitable for use to produce the high modulus ionomers include, but are not limited to, high acid embodiments of an ethylene/acrylic acid copolymer, an ethylene/methacrylic acid copolymer, an ethylene/itaconic acid copolymer, an ethylene/maleic acid copolymer, an ethylene/methacrylic acid/vinyl acetate copolymer, an ethylene/acrylic acid/vinyl alcohol copolymer, and the like.

The intermediate layer may also be formed of a binding material and an interstitial material distributed in the binding material, wherein the effective material properties of the intermediate layer are uniquely different for applied forces normal to the surface of the ball from applied forces tangential to the surface of the ball. Examples of this type of intermediate layer are disclosed in U.S. patent application Ser. No. 10/028,826. The interstitial material may extend from the intermediate layer into the core, or it may be embedded in the cover, or be in contact with the inner surface of the cover, or be embedded only in the cover.

At least one intermediate layer may also be a moisture barrier layer, such as the ones described in U.S. Pat. No. 5,820,488. The moisture barrier layer may be any suitable material having a lower water vapor transmission rate than the other layers between the core and the outer surface of the ball, i.e., cover, primer, and clear coat. The moisture barrier layer may have a water vapor transmission rate (MVTR) that is sufficiently low to reduce the loss of COR of the golf ball by at least 5% if the ball is stored at 100° F. and 70% relative humidity for six weeks as compared to the loss in COR of a golf ball that does not include the moisture barrier, has the same type of core and cover, and is stored under substantially identical conditions. For example, the material for the moisture barrier layer may have MVTR of less than 100 (mil·gm)/(m$^2$·day) when measured according to ASTM F1249 at 100% RH and around 38° C.

Alternatively, the moisture barrier layer may be prepared from a material having a weight gain of less than 2.0%, preferably less than or equal to 1.6% weight gain, more preferably less than or equal to 1.3% weight gain, or less than or equal to 1.2% weight gain, or less than or equal to 1.0% weight gain, or less than or equal to 0.8% weight gain, and or less than or equal to 0.55% weight gain, after exposure to 50% relative humidity (RH) for 90 days at room temperature (about 20-25° C.).

The range of thickness for an intermediate layer of a golf ball is large because of the many possibilities when using an intermediate layer, i.e., as an outer core layer, an inner cover layer, a wound layer, a moisture/vapor barrier layer. When used in a golf ball of the invention, the intermediate layer, or inner cover layer, may have a thickness about 0.3 inches or less. The thickness of the intermediate layer may be from about 0.002 inches to about 0.1 inches, preferably about 0.01 inches or greater. The thickness of the intermediate layer may be about 0.09 inches or less, preferably about 0.06 inches or less. The intermediate layer thickness may be about 0.05 inches or less, more preferably about 0.01 inches to about 0.045 inches. Alternatively, the intermediate layer thickness is about 0.02 inches to about 0.04 inches, or from about 0.025 inches to about 0.035 inches, or about 0.035 inches thick, or from about 0.03 inches to about 0.035 inches thick. Varying combinations of these ranges of thickness for the intermediate and outer cover layers may be used in combination with other embodiments described herein.

The ratio of the thickness of an intermediate layer to the cover layer may be about 10 or less, or about 3 or less, or about 1 or less. The core and intermediate layer(s) together form an inner ball preferably having a diameter of about 1.48 inches or greater, or about 1.52 inches or greater for a 1.68-inch ball. The inner ball of a 1.68-inch ball may have a diameter of about 1.66 inches or less. A 1.72-inch (or more) ball may have an inner ball diameter of about 1.50 inches or greater, or about 1.70 inches or less.

The golf balls may also have a plurality of pyramidal projections disposed on the intermediate layer, as disclosed in U.S. Pat. No. 6,383,092, which may cover between about 20 percent to about 80 of the surface of the intermediate layer. The golf ball may have a non-planar parting line allowing for some of the plurality of pyramidal projections to be disposed about the equator. Such a golf ball may be made using a mold disclosed in U.S. patent application Ser. No. 09/442,845, which allows for greater uniformity of the pyramidal projections.

Of note is a golf ball comprising a cover prepared from a polyurethane or polyurea composition; and a core or intermediate layer prepared from the composition as described herein. Also of note is a golf ball comprising a cover prepared from an ionomer composition; and a core or intermediate layer prepared from the composition as described herein.

Two-Piece Golf Ball Preferred Embodiments

Two-piece balls are manufactured by well-known techniques wherein covers are injection or compression molded over cores. The core of a two-piece ball is made by injection or compression molding a substantially spherical or spherically symmetrical solid of desired size and shape from the thermoplastic composition described herein that is optionally filled with sufficient filler to provide a desired core density. Desirable core density may be, for example, from about 1.14 g/cc to about 1.2 g/cc, depending on the diameter of the core and the thickness and composition of the cover to produce a golf ball meeting the weight limits (45 grams) set by the PGA.

Of note is a golf ball comprising a cover prepared from a polyurethane or polyurea composition; and a core prepared from the composition as described herein. Also of note is a golf ball comprising a cover prepared from an ionomer composition; and a core prepared from the composition as described herein.

Wound Golf Ball Preferred Embodiments

Wound balls are manufactured by well known techniques as described in, e.g., U.S. Pat. No. 4,846,910. The center or core of wound balls is made by injection or compression molding a solid (optionally semi-solid, hollow, fluid-filled, or powder-filled) of desired size and shape from a thermoplastic composition described above that is optionally filled with sufficient filler to provide a desired center density depending on the diameter of the center, the windings, and the thickness and composition of the cover to produce a golf ball meeting USGA weight limits. The size and shape of the center is such that it can be wound with elastomeric material. The windings may be any elastomeric material conventionally used in wound golf balls and are wound around the center. Covers are then injection or compression molded over the windings. Intermediate layers may be used between the windings and the cover layer.

The tensioned elastomeric material may include a polybutadiene reaction product discussed above. It may also be formed from conventional polyisoprene, or a polyurea composition. Solvent spun polyetherurea, as disclosed in U.S. Pat. No. 6,149,535, may be used to form the tensioned elastomeric material, which may be useful in achieving a smaller cross-sectional area with multiple strands. The tensioned elastomeric layer may be a high tensile filament having a tensile modulus of about 10,000 kpsi or greater, as disclosed in U.S. patent application Ser. No. 09/842,829. The tensioned elastomeric layer may be coated with a binding material that will adhere to the core and itself when activated, causing the strands of the tensioned elastomeric layer to swell and increase the cross-sectional area of the layer by at least about 5 percent, as in U.S. patent application Ser. No. 09/841,910.

Of note is a wound golf ball having a cover comprising or prepared from a polyurethane or polyurea composition; and a core or intermediate layer prepared from the composition as described herein. Also of note is a wound golf ball having a cover comprising an ionomer or prepared from an ionomer composition; and a core or intermediate layer prepared from the composition as described herein.

Multilayer Golf Ball Preferred Embodiments

Multilayer golf balls have in addition to the cover and the core, at least one additional layer between the cover and the core, also known as mantles or intermediate layers. Multilayer balls are manufactured by well-known techniques wherein an injection or compression molded core is covered by one or more intermediate layers or mantles and a cover by injection or compression molding. The various layers of a ball, (that is, the core, the mantle(s), and/or intermediate layers) are made by injection or compression molding a sphere or layer of desired size or thickness from a thermoplastic composition described herein which is optionally filled with sufficient filler to provide a golf ball meeting any desired or required weight limits. The amount of filler in the core and/or mantle(s) may be varied from 0 to about 60 weight % depending on the size (thickness) of the components and the desired location of the weight in the ball. Preferably, enough filler is used so that the ball has an overall density of 1.14 gm/cc. The filler may be used in the core and not in the mantle, in the mantle and not in the core, or in both. While not intending to be limiting as to possible combinations, examples include:

1. a core comprising the composition as described herein, with or without filler adjusted to provide a golf ball of the desired weight, with a cover made of any composition known in the art to be useful as a cover;
2. a core comprising the composition as described herein, with or without filler adjusted to provide a golf ball of the desired weight, used in a multilayer golf ball core with at least one mantle, with or without filler adjusted to provide a golf ball of the desired weight, and a cover made of any composition known in the art to be useful as a cover;
3. a core made of any composition (including thermoset compositions such as polybutadiene rubber), with or without filler provided that the weight of the finished golf ball meets the required limit with an intermediate layer comprising the composition as described herein, with or without filler provided that the weight of the finished golf ball meets the required limit.

Of note is a golf ball comprising a cover prepared from a polyurethane composition; and a core prepared from the composition as described herein, further comprising at least one additional intermediate layer. Also of note is a golf ball comprising a cover prepared from an ionomer composition; and a core prepared from the composition as described herein, further comprising at least one additional intermediate layer. Also of note is a golf ball comprising a cover prepared from a polyurethane composition; and a core, further comprising at least one additional intermediate layer prepared from the composition as described herein. Also of note is a golf ball comprising a cover prepared from an ionomer composition; and a core, further comprising at least one additional intermediate layer prepared from the composition as described herein.

After molding, the golf balls produced may undergo various further processing steps such as buffing, painting, coating, surface treating and marking for further benefits, such as disclosed in U.S. Pat. No. 4,911,451. Protective and decorative coating materials, as well as methods of applying such materials to the surface of a golf ball cover are well known in the golf ball art. Such coating materials comprise urethanes, urethane hybrids, epoxies, polyesters and acrylics. If desired, more than one coating layer may be used. The coating layer(s) may be applied by any suitable method known to those of ordinary skill in the art, such as an in-mold coating process, as described in U.S. Pat. No. 5,849,168.

The conventional technique for highlighting whiteness is to form a cover toned white with titanium dioxide, subjecting the cover to such surface treatment as corona treatment, plasma treatment, UV treatment, flame treatment, or electron beam treatment, and applying one or more layers of clear paint, which may contain a fluorescent whitening agent.

Golf ball covers frequently contain a fluorescent material and/or a dye or pigment to achieve the desired color characteristics. A golf ball may also be treated with a base resin paint composition as disclosed in U.S. Patent Publication No. 2002/0082358, which includes a derivative of 7-triazinylamino-3-phenylcoumarin as the fluorescent whitening agent to provide improved weather resistance and brightness.

In addition, trademarks or other indicia may be stamped, i.e., pad-printed, on the outer surface of the ball cover, and the stamped outer surface treated with at least one clear coat to give the ball a glossy finish and protect the indicia stamped on the cover. The golf balls may also be subjected to dye sublimation, wherein at least one golf ball component is subjected to at least one sublimating ink that migrates at a depth into the outer surface and forms an indicia. The sublimating ink may includes at least one of an azo dye, a nitroarylamine dye, or an anthraquinone dye as described in U.S. patent application Ser. No. 10/012,538.

Laser marking of a selected surface portion of a golf ball causing the laser light-irradiated portion to change color is also contemplated, as disclosed in U.S. Pat. Nos. 5,248,878 and 6,075,223. In addition, the golf balls may be subjected to ablation, i.e., directing a beam of laser radiation onto a portion of the cover, irradiating the cover portion, wherein the irradiated cover portion is ablated to form a detectable mark, wherein no significant discoloration of the cover portion results therefrom. Ablation is discussed in U.S. patent application Ser. No. 09/739,469.

Selection of Materials for Performance Criteria

Properties such as hardness, modulus, compression, resilience, core diameter, intermediate layer thickness and cover thickness of golf balls have been found to affect play characteristics such as spin, initial velocity and feel of golf balls.

Depending on the construction and desired characteristics of the golf ball, the core, intermediate layers, and cover may have different resilience, compression or hardness to achieve desired performance characteristics. The compositions described herein may be useful in preparing golf balls with resilience, compression, modulus or hardness gradients within a golf ball.

Initial Velocity and COR

The compositions described herein provide tailored resiliency as indicated by the coefficient of restitution (COR). Coefficient of restitution ($COR_{125}$) may be measured by firing a sphere that is 1.50 to 1.68 inches in diameter at an initial velocity of 125 feet/second against a steel plate positioned 3 feet from the point where initial velocity is determined and dividing the velocity of rebound from the plate by the initial velocity. One may also measure COR at several initial velocities, develop a correlation and determine a COR at a specified initial velocity based on the correlation. COR may be determined on a sphere prepared from a single composition or a sphere having two or more layers (for example, a finished golf ball). One skilled in the art will recognize that COR cannot be greater than 1.0.

The compositions described herein are highly resilient, that is, they exhibit high COR values. For spheres prepared from the composition without filler, the compositions provide COR measurements from about 0.860 or about 0.870 to about 0.90 or higher when measured according to the COR Method described herein. Any COR value within that range may be considered as "high COR". As indicated above, the presence of filler reduces the COR roughly proportional to the reduction in volume of the resin fraction of the volume of a test sphere. Compositions described herein, when containing filler, have COR of greater than about 0.83, for example from about 0.830 or about 0.845 or about 0.850 to about 0.86, or higher.

The USGA assesses resiliency by striking a sphere with a mechanical head and determining the ball's initial velocity as it passes through two light beams. The USGA has no current limit on the COR of a golf ball, but requires that the initial velocity of the golf ball cannot exceed 250±5 feet/second (ft/s). Thus, the initial velocity of the golf ball may be about 245 ft/s or greater, or about 250 ft/s or greater, or about 255 ft/s or greater. The initial velocity may be about 253 ft/s to about 254 ft/s, or about 255 ft/s.

While the current rules on initial velocity require that golf ball manufacturers stay within the USGA limits when producing golf balls for use in official events, one of ordinary skill in the art would appreciate that the golf balls described herein may provide an initial velocity outside of the USGA's prescribed range. As is discussed above, however, noncompliant golf balls may have value in purely recreational play.

As a result of the USGA's initial velocity limitation, a goal is to maximize COR without violating the 255 ft/s limit. For a solid test sphere prepared from a single composition, the COR will depend on a variety of characteristics of the composition, including its hardness. COR will generally increase as hardness is increased. In a two-piece solid golf ball with a core and a cover, one of the purposes of the cover is to produce a gain in COR over that of the core. When the contribution of the core to high COR is substantial, a lesser contribution is required from the cover. Similarly, when the cover contributes substantially to high COR of the ball, a lesser contribution is needed from the core.

Compression

The terms "compression" or "PGA Compression" used in the golf ball art define the overall resistance to deflection that a golf ball undergoes when subjected to a compressive load. Compression indicates the amount of resistance to change in a golf ball's shape upon striking. It may be measured on a finished ball or on a test piece prepared from the composition of interest. PGA compression is based on a unitless scale from 0 to 200. Each 1-point drop in PGA compression from 200 represents a change of 0.001 inch in deflection when a standard force (200 pounds) is applied to the external surface of the ball. For example, a ball that exhibits no deflection (0.0 inches in defection) is rated 200, a ball that defects 0.1 inches rated 100 and a ball that deflects 0.110 inches is rated 90 and a ball that deflects 0.2 inches is rated 0. The lower the PGA compression value, the softer the feel of the ball upon striking.

PGA compression may be determined by an apparatus fashioned in the form of a small press with an upper and lower anvil. A ball is placed between an upper anvil at rest against a 200-pound die spring, and a lower anvil is movable by means of a crank mechanism. As the lower anvil is raised by the crank, it compresses the ball against the upper anvil, the ball then loading the upper anvil that in turn loads the spring. The equilibrium point of the upper anvil is measured by a dial micrometer if the anvil is deflected by the ball more than 0.100 inches (less deflection is regarded as zero compression) and the reading on the micrometer dial is referred to as the compression of the ball. An example compression tester is produced by OK Automation, Sinking Spring, Pa. (formerly, Atti Engineering Corporation of Newark, N.J.). This machine, equipped with a Federal Dial Gauge, Model D81-C, employs a calibrated spring under a known load. Compression measured with this instrument may be referred to as "Atti compression" and corresponds to "PGA compression."

Other methods of measuring compression are known and compression values from those methods may generally be correlated to PGA compression by known algorithms.

A modified Riehle Compression Machine originally produced by Riehle Bros. Testing Machine Company, Philadelphia, Pa., may be used to evaluate compression of the various components (i.e., cores, mantles, covers, finished balls, etc.) of the golf balls. The Riehle compression device determines deformation in thousandths of an inch under a load designed to emulate the 200 pound spring constant of the Atti or PGA compression tester. Atti or PGA compression may be approximately related to Riehle compression by the following equation:

Atti or PGA compression=(160−Riehle Compression). Thus, a Riehle compression of 100 would be the same as an Atti compression of 60.

Other compression devices may also be used to measure golf ball compression, such as a Whitney Tester, Whitney Systems, Inc., Chelmsford, Mass., or an Instron Device, Instron Corporation, Canton, Mass. These devices are designed to correlate or correspond to PGA or Atti compression through a set relationship or formula. Compression of a golf ball, core, or golf ball component using an INSTRON Device (model 5544) is measured to be the deflection (in inches) caused by a 200 pound load applied in a Load Control Mode at the rate of 15 kips ($15 \times 10^3$ lbf/sec), an approach speed of 20 inches per minute, with a preload of 0.2 lbf plus the system compliance of the device. Compression values determined using an INSTRON device may range from about 0.1 to about 0.2.

The combination of resilience and compression for a golf ball may be summarized by the "Nes Factor," which is determined by taking the sum of the compression measured by an INSTRON device and resilience (COR) measurements and multiplying this value by 1000. It represents an optimal combination of softer but more resilient compositions.

Another measure of resilience is the "loss tangent," or tan $\Delta$, which is obtained when measuring the dynamic stiffness of an object. Loss tangent and terminology relating to such dynamic properties is typically described according to ASTM D4092-90. Thus, a lower loss tangent indicates a higher resiliency, thereby indicating a higher rebound capacity. Low loss tangent indicates that most of the energy imparted to a golf ball from the club is converted to dynamic energy, i.e., launch velocity and resulting longer distance. The rigidity or compressive stiffness of a golf ball may be measured, for example, by its dynamic stiffness. Higher dynamic stiffness indicates a higher compressive stiffness. For golf balls with desirable compressive stiffness, the dynamic stiffness of the material should be less than about 50,000 N/m at −50° C., for example, between about 10,000 and 40,000 N/m at −50° C., or between about 20,000 and 30,000 N/m at −50° C.

Hardness

The ratio of cover hardness to inner ball hardness may be a primary variable used to control the aerodynamics of a ball and, in particular, the spin of a ball. In general, the harder the inner ball, the greater the driver spin and the softer the cover, the greater the driver spin.

For example, the intermediate layer may be intended to be the hardest structure in the ball. When the outer cover layer is softer than the intermediate layer or inner cover layer, the ratio of the Shore D hardness of the outer cover material to that of the intermediate layer material may be about 0.8 or less, or about 0.75 or less, or about 0.7 or less, or about 0.5 or less, or about 0.45 or less. When the hardness differential between the cover layer and the intermediate layer is not intended to be as significant, the cover may have a hardness of about 55 Shore D to about 65 Shore D, and the ratio of the Shore D hardness of the outer cover to the intermediate layer is about 1.0 or less, or about 0.9 or less. When the cover layer is harder than the intermediate layer, the ratio of the Shore D hardness of the cover layer to that of the intermediate layer may be about 1.0 to about 1.33, or about 1.0 to about 1.14.

When a two-piece ball is constructed, the core may be softer than the cover. For example, the core hardness may range from about 30 Shore D to about 50 Shore D, and the cover hardness may be from about 50 Shore D to about 80 Shore D. The ratio between the cover hardness and the core hardness may be about 1.75 or less, or about 1.55 or less.

One of ordinary skill in the art understands that there is a fundamental difference between "material hardness" and "hardness, as measured directly on a golf ball." Material hardness is defined by the procedure set forth in ASTM-D2240 and involves measuring the hardness of a flat plaque formed of the material for which the hardness is to be measured. Hardness when measured directly on a golf ball or other spherical surface is a completely different measurement and results in a different hardness value. This difference results from a number of factors including, but not limited to, ball construction (i.e., core type, number of core and/or cover layers, etc.), ball (or sphere) diameter, and the material composition of adjacent layers. It should also be understood that the two measurement techniques are not linearly related and, therefore, one hardness value cannot easily be correlated to the other.

Compositions described herein have a Shore D hardness of at least about 30, and preferably about 40 to 60, as measured on a formed sphere. The compositions preferably have a Shore D hardness of about 50 to 65, as measured on a standard test plaque.

Flexural Modulus

The flexural and/or tensile modulus of an intermediate layer of a golf ball is believed to have an effect on the "feel" of the ball. The compositions described herein have a flexural modulus of about 15,000 psi to about 30,000 psi.

The selection of compositions with specific resilience, compression, hardness and/or flexural modulus will largely depend upon the type of golf ball desired (i.e., two-piece, wound, or multilayered), and in the type of performance desired for the resulting golf ball as detailed above.

The thermoplastic compositions described herein may be useful in a wide range of objects other than, mantles, intermediate layers, cores, and centers of golf balls. As previously discussed, the compositions, and optionally foamed compositions, may be used as cores for balls other than golf balls. The compositions also may be useful in other sporting equipment applications, particularly in golf shoe cleats, components of golf clubs such as golf club face plates or inserts, molded golf club heads, club head coatings or casings, and fillers for inner cavity of a golf club head, and the like. The compositions may also be used in place of materials taught in the art for use in club faces, such as poly-imides reinforced with fillers or fibers, methyl (meth)acrylate copolymers, carbon-fiber reinforced polycarbonate, materials based on PMMA and crosslinkable monomers, and cross-linked synthetic rubber. The composition may also be substituted for the cured acrylic monomer, oligomer, polymer used to impregnate wood club heads, for rubber-like elastic cores in club heads, and for molded polyurethane club heads. As such, golf club heads may be prepared having a front striking face adapted to strike a ball and an insert mounted on the striking face, said insert comprising a molded article comprising the composition above. In addition, golf club heads comprising a metal body and an insert plate secured to the forward striking surface of the metal body and made of the composition above laminated with an outer metal layer formed with grooves. In addition, this invention also includes a golf club having a shaft with a club head affixed to the shaft, wherein the club head is described above, having a component comprising the composition above.

The composition may also be useful for preparing molded articles that are footwear structural components, provide shape support for footwear construction, such as heel counters, toe puffs, soles and cleats. "Heel counter" as used herein refers to a stiff, curved piece that provides shape and structure to the heel area of a shoe. "Toe puff" or "toe box" as used herein refers to a stiff, arched piece that provides shape and structure to the toe area of a shoe. "Sole" as used herein refers to a stiff, generally flat piece that provides shape and structure to the bottom of a shoe. These structural components may be incorporated into the internal structure of the shoe and covered with additional components for wear and/or appearance.

The composition described herein may also be useful in non-sporting good applications such as caulking materials, sealants, modifiers for cement and asphalt, and coatings. The compositions may also be useful in toys, decorative objects, and containers for inert materials.

The following examples are provided to describe the invention in further detail. These examples, which set forth a preferred mode presently contemplated for carrying out the invention, are intended to illustrate and not to limit the invention.

EXAMPLES

Testing Criteria for Examples

Coefficient of Restitution (COR) was measured by firing an injection-molded neat sphere of the resin having the size of a golf ball from an air cannon at several velocities over a range of roughly 60 to 180 fps. The spheres struck a steel plate positioned three feet away from the point where initial velocity is determined, and rebounded through a speed-monitoring device located at the same point as the initial velocity measurement. The COR of each measurement was determined as the ratio of rebound velocity to initial velocity. The individually determined COR measurements were plotted as a function of initial velocity, and COR at 125 fps (i.e. $COR_{125}$) was determined by linear regression.

As used in the Examples below, melt index (MI) refers to melt index as determined according to ASTM D1238 at 190° C. using a 2160 g weight, with values of MI reported in g/10 minutes.

As used herein, "Shore D hardness" of a material is measured generally in accordance with ASTM D-2240 either on a plaque or on the curved surface of a molded sphere. Shore D hardness of multilayer spheres is measured with all layers present. When a hardness measurement is made on a dimpled sphere, Shore D hardness is measured at a land area of the dimpled sphere.

Flex Modulus was measured according to ASTM D790, Method 1, Procedure A, employing a 3-point test fixture with a 2-inch span length and a crosshead speed of 0.50 inches/minute. The method provides a measurement of the Tangent Modulus of Elasticity (3-Point Flex Modulus).

PGA Compression was measured using an "Atti" testing device according to standard procedures for that instrument. For accurate comparison of compression data, the diameter of the balls was corrected to 1.68 inch diameter using accepted methods, such as shimming.

Materials Used:

EAC-1: An ethylene methacrylic acid (MAA) dipolymer with 20 weight % of MAA, with MI of 500.

EAC-2: An ethylene methacrylic acid (MAA) dipolymer with 19 weight % of MAA, with MI of 305.

EAC-3: An ethylene methacrylic acid (MAA) dipolymer with 19 weight % of MAA, with MI of 250.

EAC-4: An ethylene acrylic acid (AA) dipolymer with 21 weight % of AA, with an MI of 300.

EAC-5: An ethylene acrylic acid (AA) dipolymer with 18 weight % of AA, with an MI of 60.

EAC-6: An ethylene acrylic acid (AA) dipolymer with 15.4 weight % of AA, with an MI of 80.

MB-1: A $Mg(OH)_2$ concentrate with 49 weight % $Mg(OH)_2$ in an ethylene acrylic acid (AA) n-butyl acrylate (nBA) terpolymer having 6.2 weight % AA and 28.0 weight % nBA, with MI of 300.

MB-2: A $Mg(OH)_2$ concentrate with 50 weight % $Mg(OH)_2$ in an ethylene methacrylic acid (MAA) dipolymer having 5 weight % MAA, with MI of 500.

Filler: crystalline tungsten powder, with specific gravity of 19.3 g/cc, available from ATI Alldyne Powder Technologies of Huntsville, Ala., or Kulite Tungsten Corporation of East Rutherford, N.J.

Oleic acid, commercial grade from PMC Biogenix under the tradename INDUSTRENE 106.

"PBR" refers to a conventional filled thermoset polybutadiene rubber core. In the Tables below, "NA" means "not available".

Blends were prepared according to the following general procedure.

Employing a Werner & Pfleiderer twin screw extruder, oleic acid, an ethylene acid dipolymer, and neutralizing agent (MB-1, MB-2 and/or $Mg(OH)_2$) were melt blended. The amounts of the acid and copolymer were added so that the resulting blend contained 35 to 45 weight % of the oleic acid. The blend was treated with sufficient MB-1, MB-2 and/or $Mg(OH)_2$ so that the acid moieties of the organic acid and the acid copolymer were nominally neutralized to the level indicated.

Extrusion conditions for making the blends identified in Table 2 are shown in Table 1.

TABLE 1

|  | Zone 1 | Zone 2-4 | Zone 5 | Die | Melt |
|---|---|---|---|---|---|
| Temperature ° C. | 140-180 | 265-275 | 255-265 | 200-220 | 255-275 |
| Vacuum inches | 28 | | | | |
| Screw Speed rpm | 175-250 | | | | |
| Total rate (lb/h) | 15-25 | | | | |

The components of the blends are summarized in Table 2. Comparative Examples C14-16 are blends comprising a high acid ethylene copolymer with lower MI, neutralized with $Mg(OH)_2$ to less than 100% nominal neutralization, prepared using procedures similar to those used for the Examples. Except for Example 3 and Comparative Example C14 where the $Mg(OH)_2$ was added directly as a powder, the $Mg(OH)_2$ was added using a masterbatch. The amount of $Mg(OH)_2$ added is related to its concentration in the masterbatch. The column labeled "$Mg(OH)_2$" shows the amount of $Mg(OH)_2$ calculated to be present in the composition based on the amount of MB-1 or MB-2 added. "% Nominal Neutralization" is calculated from the amount of acid groups present in the dipolymer, the amount of organic acid, and the amount of $Mg(OH)_2$.

TABLE 2

| Example | Dipolymer used | Weight % Dipolymer | Oleic Acid | MB-1 | $Mg(OH)_2$ | % Nominal Neutralization | Measured MI |
|---|---|---|---|---|---|---|---|
| 1 | EAC-1 | 35.40 | 39.90 | 24.70 | 12.10 | 178 | 0.72 |
| 2 | EAC-1 | 38.15 | 38.30 | 23.55 | 11.55 | 170 | 0.59 |
| 3 | EAC-1 | 54.01 | 35.86 | 0.00 | 10.13 | 139 | 0.63 |
| 4 | EAC-1 | 40.90 | 36.70 | 22.40 | 11.00 | 162 | 0.45 |
| 5 | EAC-2 | 39.70 | 41.10 | 19.20 | 9.41 | 134 | 1.20 |
| 6 | EAC-2 | 34.50 | 41.40 | 24.10 | 11.80 | 174 | 0.75 |
| 7 | EAC-2 | 39.70 | 41.10 | 19.20 | 9.41 | 134 | 0.26 |
| 8 | EAC-2 | 38.80 | 39.00 | 22.20 | 10.85 | 160 | 0.61 |
| 9 | EAC-2 | 42.80 | 36.90 | 20.30 | 9.90 | 146 | 0.50 |
| 10 | EAC-2 | 31.14 | 46.00 | 22.86 | 11.20 | 160 | 0.62 |
| 11 | EAC-3 | 36.22 | 39.90 | 23.88 | 11.70 | 174 | 0.96 |
| 12 | EAC-3 | 47.37 | 35.00 | 17.63 | 8.64 | 126 | 1.20 |
| 13 | EAC-4 | 44.33 | 36.84 | 19.84 | 9.72 | 125 | 0.03 |
| C14 | EAC-5 | 57.5 | 36.00 | 0 | 6.50 | 81 | 0.8 |
| 20 | EAC-5 | 49.60 | 34.82 40.42 | 15.58 | 7.94 | 150 | 0.22 |
| 21 | EAC-5 | 44.93 | Erucic acid MB-2 | 14.65 | 7.56 | 153 | 0.46 |
| C15 | EAC-5 | 45.00 | 40.00 | 15.00 | 7.50 | 97 | 0.75 |
| C16 | EAC-6 | 45.72 | 40.00 | 14.28 | 7.14 | 98 | 0.38 |

In addition, the compositions prepared in Examples 2 and 8 were filled with tungsten filler (Table 3). Fillers were added on a twin screw extruder at conditions to melt the polymer composition and incorporate the filler. Filler was either added to the back end of the extruder with the pellet feed or at a downstream feed port along the extruder barrel. "Resin Volume %" is the percentage of the total volume of the composition occupied by the non-filler components.

TABLE 3

| Example | Non-filled Composition | Resin Volume % |
|---|---|---|
| 17 | Example 2 | 98.5 |
| 18 | Example 2 | 97.4 |
| 19 | Example 8 | 98.5 |

Thermoplastic Spheres

The compositions were molded into spheres 1.53 to 1.55 inches in diameter using the molding conditions shown in Table 4. General molding conditions are reported as ranges, with specific conditions for selected examples indicated. The example spheres are summarized in Table 5.

TABLE 4

Molding Conditions for Spheres

| Example | Melt Zone (° C.) | Mold (° C.) | Inject (s) | Fill (s) | Pack (s) | Pack (mPa) | Cool (s) |
|---|---|---|---|---|---|---|---|
| General | 190-230 | 20-50 | 80-90 | 10-30 | 55-75 | 50-160 | 75-80 |
| 3 | 227 | 24 | 85.0 | 20.9 | 64.1 | 86.2 | 80.0 |
| 4 | 213 | 27 | 80.0 | 21.9 | 58.1 | 93.6 | 75.0 |
| 6 | 213 | 27 | 80.0 | 22.0 | 58.1 | 83.1 | 75.0 |
| 7 | 196 | 21 | 85.0 | 20.3 | 64.7 | 149.2 | 80.0 |
| 9 | 213 | 27 | 80.0 | 21.7 | 58.3 | 100.1 | 75.0 |
| 17 | 224 | 24 | 85.0 | 13.2 | 71.8 | 121.4 | 80.0 |
| 18 | 224 | 24 | 85.0 | 13.1 | 71.9 | 129.7 | 80.0 |

TABLE 5

| Example | Diameter (in) | Mass (g) | Specific Gravity (g/cc) |
|---|---|---|---|
| 1 | 1.5428 | 32.015 | 1.012 |
| 2 | 1.5507 | 32.007 | 0.999 |
| 3 | 1.5360 | 30.910 | 0.994 |
| 4 | 1.5429 | 31.680 | 1.004 |
| 5 | 1.5382 | 31.279 | 1.002 |
| 6 | 1.5407 | 31.669 | 1.012 |
| 7 | 1.5242 | 30.415 | 1.003 |
| 8 | 1.5068 | 29.488 | 0.992 |
| 9 | 1.5404 | 31.183 | 0.995 |
| 10 | 1.5377 | 30.772 | 0.986 |
| 11 | 1.5364 | 31.215 | 1.003 |
| 12 | 1.5427 | 30.121 | 0.955 |
| 13 | 1.5467 | 31.450 | 0.989 |
| C14 | NA | NA | NA |
| C15 | NA | NA | NA |
| C16 | NA | NA | NA |
| 17 | 1.5340 | 37.301 | 1.204 |
| 18 | 1.5270 | 41.868 | 1.366 |
| 19 | 1.5331 | 37.316 | 1.205 |
| 20 | 1.561 | 30.705 | 0.940 |
| 21 | 1.563 | 30.459 | 0.930 |
| PBR | 1.552 | 37.158 | 1.158 |

The spheres were tested for Coefficient of Restitution, PGA Compression and Shore D Hardness. Compositions were also compression molded into standard test plaques 0.125 inches thick and cut into specimens 0.5 inches wide and 3 to 5 inches in length to measure flex modulus and Shore D hardness. The samples were conditioned for two weeks at ASTM lab conditions (73° F. and 50% RH). The results are reported in Tables 6 and 7. In Table 7, "COR loss" is the difference in COR between the unfilled and filled compositions (Examples 15 and 16 compared to Example 2 and Example 17 compared to Example 8).

TABLE 6

| | Sphere | | | Plaque | |
| | | | | Flexural | |
| Example | $COR_{125}$ | PGA Compression | Shore D Hardness | Modulus (psi) | Shore D Hardness |
|---|---|---|---|---|---|
| 1 | 0.867 | 119.3 | 48.5 | 20,468 | 55 |
| 2 | 0.866 | 120.4 | 52.0 | 21,543 | 57 |
| 3 | 0.864 | 130.1 | 56.0 | 24,522 | 60 |
| 4 | 0.862 | 128.2 | 50.6 | 20,957 | 57 |
| 5 | 0.868 | 114.5 | 48.1 | 16,839 | 54 |
| 6 | 0.867 | 115.6 | 47.1 | 20,142 | 56 |
| 7 | 0.866 | 116.1 | 51.3 | 20,042 | 57 |
| 8 | 0.865 | 127.6 | 51.0 | 20,877 | 57 |
| 9 | 0.863 | 119.3 | 49.6 | 21,498 | 57 |
| 10 | 0.862 | 115.4 | 49.2 | 18,383 | 54 |
| 11 | 0.862 | 108.6 | 47.4 | 17,226 | 56 |
| 12 | 0.860 | 95.9 | 53.0 | 20,824 | 57 |
| 13 | 0.884 | 129.1 | 58.7 | NA | NA |
| C14 | 0.819 | 122 | NA | 20,600 | 57 |
| C15 | 0.818 | 124.6 | NA | NA | NA |
| C16 | 0.821 | 115.1 | NA | NA | NA |
| 20 | 0.867 | 107.7 | 55.9 | NA | NA |
| 21 | 0.872 | 96.9 | 50.1 | NA | NA |

TABLE 7

| | Sphere | | | | Plaque | |
| | | | | | Flexural | Shore D |
| Example | $COR_{125}$ | COR Loss | PGA Compression | Shore D Hardness | Modulus (psi) | Hardness |
|---|---|---|---|---|---|---|
| 17 | 0.853 | 0.013 | 124.9 | 53.4 | 21,665 | 57 |
| 18 | 0.839 | 0.027 | 123.9 | 52.9 | 21,343 | 57 |
| 19 | 0.856 | 0.009 | 123.1 | 53.8 | 21,596 | 57 |
| PBR | 0.692 | NA | 65.0 | 40.2 | NA | NA |

While certain of the preferred embodiments of the present invention have been described and specifically exemplified above, it is not intended that the invention be limited to such embodiments. Various modifications may be made without departing from the scope and spirit of the present invention, as set forth in the following claims.

What is claimed is:

1. A golf ball comprising a core and a cover and optionally at least one intermediate layer positioned between the core and the cover, wherein the core or the intermediate layer when present comprises or is prepared from a thermoplastic composition, said thermoplastic composition optionally comprising a filler; wherein the thermoplastic composition has a PGA compression greater than 100; and further wherein the thermoplastic composition when formed into a sphere of 1.50 to 1.68 inches in diameter has a coefficient of restitution, said coefficient of restitution being measured by firing the sphere at an initial velocity of 125 feet/second against a steel plate positioned 3 feet from the point where initial velocity is determined and dividing the velocity of rebound from the plate by the initial velocity; wherein the coefficient of restitution is equal to or greater than 0.860 when the thermoplastic composition does not comprise filler; and wherein the coefficient of restitution is equal to or greater than 0.830 when the thermoplastic composition comprises filler, wherein the thermoplastic composition comprises or is prepared from:

(a) at least one aliphatic, monofunctional organic acid having 4 to 36 carbon atoms, wherein the longest carbon chain of the acid is optionally substituted with from one to three substituents independently selected from $C_1$ to $C_8$ alkyl groups;

(b) an ethylene acid copolymer consisting essentially of copolymerized conomoners of ethylene and from 18 to 24 weight % of copolymerized comonomers of at least one $C_3$ to $C_8$ α,β ethylenically unsaturated carboxylic acid, based on the total weight of the ethylene acidcopolymer, said ethylene acid copolymer having a melt index from about 200 to about 600 g/10 minutes measured before neutralization according to ASTM D1238 at 190° C. using a 2160 g weight; and wherein the combined acid moieties of (a) and (b) are nominally neutralized to a level from about 120% to about 200%.

2. The golf ball of claim 1 wherein the coefficient of restitution is equal to or greater than 0.870 or 0.875.

3. The golf ball of claim 1 wherein the organic acid is present in from about 35 to about 46 weight % of the total composition.

4. The golf ball of claim 1 wherein the organic acid comprises a linear, unsaturated organic acid having from 16 to 24 carbon atoms.

5. The golf ball of claim 4 wherein the organic acid comprises oleic acid.

6. The golf ball of claim 1 wherein the $C_3$ to $C_8$ α,β ethylenically unsaturated carboxylic acid is acrylic acid or methacrylic acid or a combination of acrylic acid and methacrylic acid.

7. The golf ball of claim 1 wherein the thermoplastic composition comprises filler; or wherein the golf ball has a cover prepared from a polyurethane composition or an ionomer composition.

8. The golf ball of claim 7 wherein the filler comprises tungsten, barium sulfate, titanium or zinc oxide.

9. The golf ball of claim 7 wherein the core comprises the thermoplastic composition.

10. The golf ball of claim 7 comprising the optional intermediate layer, said optional intermediate layer comprising the thermoplastic composition.

11. The golf ball of claim 1 wherein the core comprises the thermoplastic composition.

12. The golf ball of claim 1 comprising the optional intermediate layer, said optional intermediate layer comprising the thermoplastic composition.

13. A thermoplastic composition comprising or prepared from:

(a) at least one aliphatic, monofunctional organic acid having 4 to 36 carbon atoms, optionally substituted with from one to three substituents independently selected from $C_1$ to $C_8$ alkyl groups;

(b) an ethylene acid copolymer consisting essentially of copolymerized comonomers of ethylene and from 18 to 24 weight % of copolymerized comonomers of at least one $C_3$ to $C_8$ α,β ethylenically unsaturated carboxylic acid, based on the total weight of the ethylene acid copolymer, having a melt index from about 200 to about 600 g/10 minutes measured according to ASTM D1238 at 190° C. using a 2160 g weight;

wherein the combined acid moieties of (a) and (b) are nominally neutralized to a level from about 120% to about 200%; and optionally (c) filler.

14. The composition of claim 13 wherein the neutralized organic acid is present in from about 35 to about 45 weight % of the total composition.

15. The composition of claim 13 wherein the organic acid comprises a linear, unsaturated organic acid having from 16 to 24 carbon atoms.

16. The composition of claim 13 wherein the organic acid comprises oleic acid.

17. The composition of claim 13 wherein the $C_3$ to $C_8$ α,β ethylenically unsaturated carboxylic acid is acrylic acid or methacrylic acid or a combination thereof.

18. The composition of claim 13 having a PGA compression greater than 100 and a coefficient of restitution that is measured by forming a sphere of 1.50 to 1.68 inches in diameter and firing the sphere at an initial velocity of 125 feet/second against a steel plate positioned 3 feet from the point where initial velocity is determined and dividing the velocity of rebound from the plate by the initial velocity;

wherein the coefficient of restitution is equal to or greater than 0.860 when the composition does not comprise filler; and wherein the coefficient of restitution is equal to or greater than 0.830 when the composition comprises filler.

19. The composition of claim 18 wherein the composition does not comprise filler and the coefficient of restitution is equal to or greater than 0.870 or 0.875.

20. The composition of claim 13 wherein the filler comprises tungsten, barium sulfate, titanium or zinc oxide.

21. An article comprising the composition of claim 13, wherein the composition is foamed by the addition of at least one physical or chemical blowing or foaming agent or by blending with polymeric, ceramic, metal, and glass microspheres.

22. The article of claim 21 that is a golf ball or other ball comprising a core or center prepared from the composition.

* * * * *